United States Patent
Pearson et al.

(10) Patent No.: US 7,921,165 B2
(45) Date of Patent: Apr. 5, 2011

(54) RETAINING MAIL FOR AVAILABILITY AFTER RELAY

(75) Inventors: Malcolm E. Pearson, Kirkland, WA (US); Narasimhan Sundararajan, Redmond, WA (US); Greg Thiel, Black Diamond, WA (US)

(73) Assignee: Microsoft Corporation, Redmond, WA (US)

( * ) Notice: Subject to any disclaimer, the term of this patent is extended or adjusted under 35 U.S.C. 154(b) by 508 days.

(21) Appl. No.: 11/290,026

(22) Filed: Nov. 30, 2005

(65) Prior Publication Data

US 2007/0124484 A1 May 31, 2007

(51) Int. Cl.
*G06F 15/16* (2006.01)
(52) U.S. Cl. ......................... 709/206; 709/205
(58) Field of Classification Search .................. 709/204, 709/205, 206
See application file for complete search history.

(56) References Cited

U.S. PATENT DOCUMENTS

| | | |
|---|---|---|
| 3,898,623 A | 8/1975 | Cormier |
| 4,402,046 A | 8/1983 | Cox et al. |
| 5,812,793 A | 9/1998 | Shakib et al. |
| 5,872,930 A | 2/1999 | Masters et al. |
| 5,941,946 A | 8/1999 | Baldwin et al. |
| 6,073,142 A | 6/2000 | Geiger et al. |
| 6,208,720 B1 | 3/2001 | Curtis et al. |
| 6,226,666 B1 | 5/2001 | Chang et al. |
| 6,249,807 B1 * | 6/2001 | Shaw et al. ............ 709/206 |
| 6,256,677 B1 * | 7/2001 | Pribnow et al. ............ 709/250 |
| 6,336,135 B1 | 1/2002 | Niblett et al. |
| 6,442,546 B1 | 8/2002 | Biliris et al. |
| 6,487,586 B2 * | 11/2002 | Ogilvie et al. ............ 709/206 |
| 6,542,075 B2 | 4/2003 | Barker et al. |
| 6,628,935 B1 * | 9/2003 | Lawrence ............ 455/412.1 |
| 6,647,474 B2 | 11/2003 | Yanai et al. |
| 6,658,454 B1 | 12/2003 | Delany et al. |
| 6,678,828 B1 | 1/2004 | Pham et al. |
| 6,704,772 B1 | 3/2004 | Ahmed et al. |
| 6,745,303 B2 | 6/2004 | Watanabe |
| 6,823,349 B1 | 11/2004 | Taylor et al. |
| 6,889,231 B1 | 5/2005 | Souder et al. |
| 6,889,244 B1 | 5/2005 | Gaither et al. |
| 6,931,532 B1 | 8/2005 | Davis et al. |
| 6,941,459 B1 | 9/2005 | Hind et al. |
| 6,961,849 B1 | 11/2005 | Davis et al. |
| 6,978,367 B1 | 12/2005 | Hind et al. |
| 7,155,483 B1 | 12/2006 | Friend et al. |
| 7,181,017 B1 | 2/2007 | Nagel et al. |
| 7,340,438 B2 | 3/2008 | Nordman et al. |
| 7,376,957 B1 * | 5/2008 | Scurlock, Jr. ............ 719/314 |
| 7,395,314 B2 | 7/2008 | Smith et al. |
| 7,522,908 B2 | 4/2009 | Hrastar |

(Continued)

FOREIGN PATENT DOCUMENTS

WO 0127772 A1 4/2001

OTHER PUBLICATIONS

Symantec Corporation, White Paper: Enterprise Security, "Email Security and Availability," http://enterprisesecurity.symantec.com, Jul. 2005, 30 pages.

(Continued)

*Primary Examiner* — Jeffrey Pwu
*Assistant Examiner* — Shaq Taha
(74) *Attorney, Agent, or Firm* — Senniger Powers LLP (57) ABSTRACT

A processor 104 executes computer-executable instructions to receive messages 302; store 304 the received messages in a foreground memory 108; process 306 the stored messages in the foreground memory 108; send 306 the processed messages; move 308 the sent messages to a background memory 110; evaluate 310, 312 the messages in the background memory with respect to a parameter; and delete 314 selected messages in the background memory as a function of the evaluating. Alternatively, a message queue may be used to track lost messages.

17 Claims, 4 Drawing Sheets

U.S. PATENT DOCUMENTS

| | | | |
|---|---|---|---|
| 7,603,423 B2 | 10/2009 | Ito et al. | |
| 7,660,897 B2 | 2/2010 | Hall, Jr. et al. | |
| 2001/0032245 A1 | 10/2001 | Fodor | |
| 2001/0054073 A1 | 12/2001 | Ruppert et al. | |
| 2002/0048369 A1 | 4/2002 | Ginter et al. | |
| 2002/0099816 A1 | 7/2002 | Quarterman et al. | |
| 2002/0120711 A1 | 8/2002 | Bantz et al. | |
| 2002/0162047 A1 | 10/2002 | Peters et al. | |
| 2002/0193128 A1* | 12/2002 | Park | 455/466 |
| 2002/0194335 A1 | 12/2002 | Maynard | |
| 2003/0028580 A1 | 2/2003 | Kucherawy | |
| 2003/0055903 A1 | 3/2003 | Freed | |
| 2003/0061265 A1 | 3/2003 | Maso et al. | |
| 2003/0074408 A1 | 4/2003 | Clark et al. | |
| 2003/0149888 A1 | 8/2003 | Yadav | |
| 2003/0154254 A1* | 8/2003 | Awasthi | 709/206 |
| 2003/0177194 A1 | 9/2003 | Crocker et al. | |
| 2004/0059789 A1 | 3/2004 | Shum | |
| 2004/0162880 A1 | 8/2004 | Arnone et al. | |
| 2004/0167965 A1 | 8/2004 | Addante et al. | |
| 2005/0015484 A1 | 1/2005 | Brazdrum et al. | |
| 2005/0044151 A1 | 2/2005 | Jiang et al. | |
| 2005/0081059 A1* | 4/2005 | Bandini et al. | 713/201 |
| 2005/0083915 A1 | 4/2005 | Mathew et al. | |
| 2005/0091323 A1 | 4/2005 | Smith et al. | |
| 2005/0108343 A1 | 5/2005 | Collet et al. | |
| 2005/0149479 A1 | 7/2005 | Richardson et al. | |
| 2005/0160248 A1 | 7/2005 | Yamagami | |
| 2005/0188035 A1 | 8/2005 | Ueno | |
| 2005/0198155 A1 | 9/2005 | Zakharoff | |
| 2005/0198168 A1 | 9/2005 | Marston et al. | |
| 2005/0198170 A1* | 9/2005 | LeMay et al. | 709/206 |
| 2005/0223085 A1 | 10/2005 | Giles et al. | |
| 2005/0228867 A1 | 10/2005 | Osborne et al. | |
| 2005/0256931 A1 | 11/2005 | Follmeg et al. | |
| 2005/0262205 A1* | 11/2005 | Nikolov et al. | 709/206 |
| 2005/0278620 A1 | 12/2005 | Baldwin et al. | |
| 2006/0010221 A1* | 1/2006 | Srinivasan | 709/206 |
| 2006/0089128 A1* | 4/2006 | Smith et al. | 455/412.1 |
| 2006/0155810 A1* | 7/2006 | Butcher | 709/206 |
| 2006/0168046 A1* | 7/2006 | Qureshi | 709/206 |
| 2006/0230174 A1 | 10/2006 | Hoche et al. | |
| 2006/0253597 A1* | 11/2006 | Mujica | 709/229 |
| 2007/0100701 A1 | 5/2007 | Bocoon-Gibod et al. | |
| 2007/0168336 A1 | 7/2007 | Ransil et al. | |
| 2008/0060080 A1 | 3/2008 | Lim | |
| 2008/0222127 A1 | 9/2008 | Bergin | |
| 2008/0320486 A1 | 12/2008 | Bose et al. | |

OTHER PUBLICATIONS

Sendmail, Inc., White Paper: "The Complete Internet Mail Solution," www.hp.com, 2002, 20 pages.

WWW.COLUMBIA.EDU, AcIS UnixDev, "Mail Architecture Proposal," 2004. pp. 1-4.

Sun Microsystems, Chapter 5 Deployment Design, Online, Feb. 2005, Retrieved Jul. 2009, http://web.archive.org/web20050219003745/http://docs.sun.com/source/819-0058/dep_archetect.html, pp. 1-22.

* cited by examiner

FIG. 2

FIG. 3
DELAY & PRUNING

FIG. 4
RE-INJECTION

RETAINING MAIL FOR AVAILABILITY AFTER RELAY

BACKGROUND

This generally relates to transport systems and methods and, for example, the handling of messages such as email.

Frequently, transport systems such as email systems employ two transport components, a message store and a message transport agent (MTA) which constitute a log-shipping based mechanism. There is a window in such log-shipping based mechanisms during which mail in the last log file not shipped is not immediately available at the backup node. Additionally, logs can only be replayed before transactions are applied to the database. As a result, recovery of the log file after the secondary is re-started does not allow the transactions to be re-applied. Messages that may be lost because the delayed log file will include messages received from other users. Such lost messages do pass through the mail transport agent and are important to save.

Messaging system, like database and other storage systems, must exhibit ACID properties (atomic, consistent, isolated, durable). To achieve this, messaging systems employ 'change logs' in much the same way database systems do—record the change in the log, harden the log to persistent media, change the actual data, and continue. There is no need to harden the actual data change the 'change log' has been hardened and during restart from any error the change log will be used to make the data current.

SUMMARY

In one embodiment, a message transport agent is used to provide an additional point of redundancy, to enable the recovery of messages. In another embodiment, mechanisms based on log shipping are implemented to provide a highly available shared-nothing system. There is no need to harden the actual data change because the 'change log' has been hardened and during restart from any error the change log may be used to make the data current.

Mail is retained after delivery, either mail of all recipients or mail for local delivery or both. Alternatively or in addition, retained mail based on total size and/or age is pruned and/or retained mail is re-injected on demand.

Other features will be in part apparent and in part pointed out hereinafter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
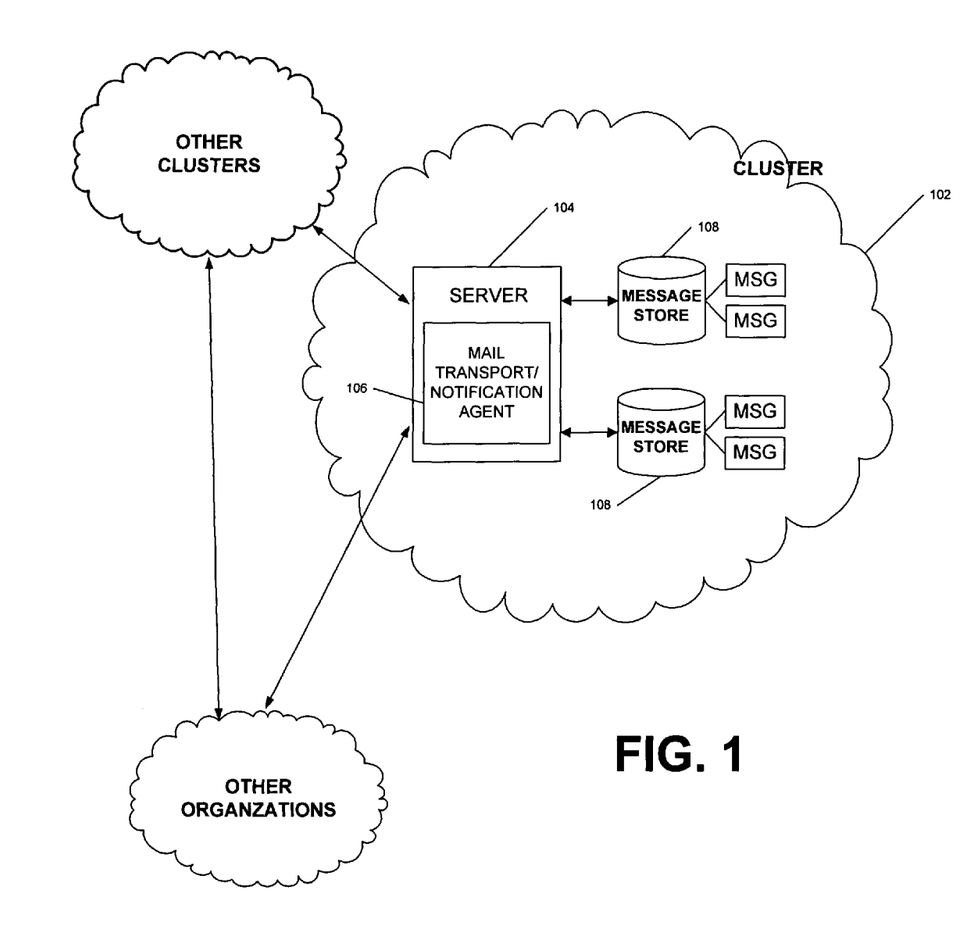
FIG. 1 illustrates one embodiment of an operating environment of an embodiment of the invention.

As illustrated in FIG. 1, one embodiment of an operating environment of an embodiment of the invention includes various clusters and organizations that are transmitting and receiving messages, including relaying messages, such as mail therebetween. Reference character 102 illustrates one embodiment of an exemplary cluster. Cluster 102 includes a server 104 having a executable mail transport/notification agent 106 for sending and receiving mail to and from other clusters. In addition, the mail transport agent (MTA) sends and receives mail to various message stores 108 as well as relaying mail to other MTAs (e.g., other organizations and/or other clusters).

Using such storage mechanism messaging systems face the same error recovery problems databases do, namely a current version of the log must be available to make the data current. This forces the messaging systems to assure the log is always available, and always current—which is expensive if the 'recovery system' is different than the system currently hosting the messaging system because that requires each update to the log to be made in at least two locations. The invention solves the 'dual log update' performance costs associated with a 'recovery system' for messaging by obviating the need to keep the change logs current at the 'recovery system' for many kinds of changes—those logs are now allowed to be somewhat stale. This reduces the performance impact of having a recovery system, and thus makes highly available messaging systems much more practical, and cost effective. In other words, messaging systems exploit information in the messaging systems transport layer to help make the data in the 'recovery system' current.

Messaging systems, unlike many traditional database systems, have a 'transport subsystem' atop the message store. This transport subsystem is responsible for routing the messages to the correct recipients even if the messaging servers for the recipients are current unavailable. It does this 'guaranteed message delivery' using a persistent queue mechanism. When a message is received for delivery or forwarding it is stored, then an attempt it made to deliver, or forward it. If that forwarding or delivery is successful the message is deleted from the queue, otherwise delivery/forwarding is attempted again after some period of time has expired.

Figure 2:
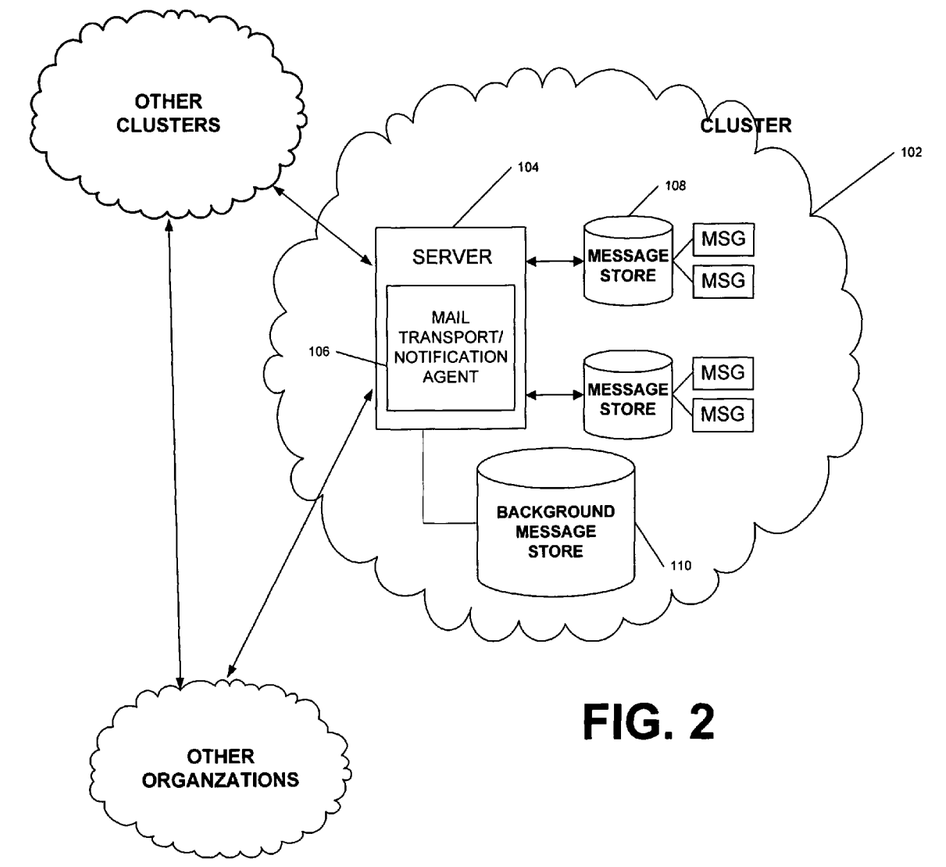
FIG. 2 is a block diagram of one embodiment of the invention.

As illustrated in FIG. 2, one embodiment of the invention for a system for handling messages includes various clusters and organizations that are transmitting and receiving messages such as mail therebetween. Reference character 102 illustrates one embodiment of an exemplary cluster. Cluster 102 includes a server 104 having an executable mail transport/notification agent 106 for sending and receiving mail to and from other clusters. In addition, the mail transport agent (MTA) sends and receives mail to various message stores 108 as well as relaying mail to other MTAs (e.g., other organizations and/or other clusters). Thus, the server 104 comprises a processor configured to execute computer-executable instructions to receive messages, to store the received messages, to process the stored messages and to send the processed messages. After sending the processed message, the server 104 moves the sent messages to a holding status, such as a background message store 110. In one embodiment, the system includes instructions to move the sent messages to a holding status such as instructions to mark the sent messages as background or instructions to redirect the sent messages to a background memory, which is different with respect to a foreground memory in which the received/processed messages are stored.

In one embodiment, the processor evaluates moved messages in the holding status with respect to a parameter and deletes selected messages in the holding status as a function of the evaluating. For example, the parameter may optionally comprise a maximum amount of memory. In this embodiment, the instructions to evaluate the moved messages in the holding status determines an amount of holding memory storing the messages in the holding status, and the instructions to delete at least some of the messages in the holding status when the determined amount of holding memory exceeds the maximum amount of memory. In addition, the system may optionally include delete messages as a function a limit or boundary such as at least one of a message age, a message size, a message date, and a message priority when the determined amount of holding memory exceeds the maximum amount of memory. For example, when the determined amount of holding memory exceeds a maximum amount of memory, a message having a sent date which is more than a certain amount of time (e.g., three (3) days) before the present time could be deleted. Alternatively or in addition, when the determined amount of holding memory exceeds the maximum amount of memory, a message having a size which is more than a certain maximum size (e.g., 10 MB) could be deleted. Alternatively or in addition, when the determined amount of holding memory exceeds the maximum amount of memory, a message having a particular date (e.g., a date calculated or indicated by an operator) could be deleted. Alternatively or in addition, when the determined amount of holding memory exceeds the maximum amount of memory, a message having a priority which is less than a certain minimum priority could be deleted. For example, messages having a priority of 7-10 may be deleted if the minimum priority is 6 in a priority system where messages have a priority of 1 to 10 with 1 being the highest priority and 10 being the lowest priority.

Alternatively or in addition, the system may manage or delete messages independent of when the determined amount of holding memory exceeds the maximum amount of memory. For example, the parameter may comprise a maximum message age. Instructions evaluate the moved messages in the holding status to determine an age of each message and instructions delete each message in the holding status when the determined age of the message exceeds the maximum message age, even if the determined amount of holding memory is less than the maximum amount of memory.

As another example, the parameter may comprise a maximum message size. Instructions evaluate the moved messages in the holding status to determine a size of each message. Instructions delete each message in the holding status when the determined size of the message exceeds the maximum message size, even if the determined amount of holding memory is less than the maximum amount of memory.

As another example, the parameter may comprise a maximum message date. Instructions evaluate the moved messages in the holding status to determine a date of each message. Instructions delete each message in the holding status when the determined date of the message exceeds the maximum message date, even if the determined amount of holding memory is less than the maximum amount of memory.

As another example, the parameter may comprise a minimum message priority. Instructions evaluate the moved messages in the holding status to determine a priority of each message. Instructions delete each message in the holding status when the determined priority of the message is less than the minimum message priority, even if the determined amount of holding memory is less than the maximum amount of memory.

The limits or boundaries noted above may be preset, fixed or variable, such as dependent on other aspects of the system or method. For example, the maximum amount of memory may vary depending on available memory. As another example, the minimum retained priority may vary based on available memory. As another example, the maximum message age may vary based on available memory. As another example, the maximum message size may change based on available memory. As another example, the oldest message date may change based on available memory.

It is contemplated that any of the above may be combined with other prioritization mechanisms. For example, mail that is more business critical is retained longer, and less critical mail is not retained, reducing the overall storage costs.

Optionally, the server 104 may be configured to execute computer-executable instructions to monitor mailboxes for failure and resend messages in the holding status to a failed mailbox.

Optionally, the server 104 may be configured to execute computer-executable instructions to receive a request for mail from a particular mailbox and to resend messages in the holding status to the particular mailbox in response to the received request.

One embodiment of the invention is that if transport does not delete those messages for some period of time (typically minutes) after successful delivery of the message, then that queue acts as a surrogate change log for the associated message store(s). Just as the recovery system can read the actual change log to make data current, it can also request recent messaging activity from the transport layer to similarly make the data current. Because there is now two potential sources of recovery data for that information, the recovery system change log AND the transport queues (which are now retaining information for some period of time even if the message has been successfully delivered) the message store can make the recovery system current if either the change log, OR transport is current. From this we then know we can avoid forcing the change log on the recovery system to be current if transport knows about the message. By eliminating the need to keep the change log on the recovery current in those cases, we have dramatically reduced the negative performance impact of having a recovery system—and thus made recovery systems for messaging more cost effective and practical.

One embodiment of an algorithm for recovery in a messaging system is:
Starting with a stale version of the data
   While there are change log records to apply
   If that change log record has not been applied to the data
     Apply the change
   With this change it becomes:
Starting with a stale version of the data
   While there are change log records to apply
   If that change log record has not been applied to the data
     Apply the change
   While there are messages in the transport queue
   If that change has not been reflected in the data
     Apply the corresponding change
Similarly, a algorithm for forcing the change log in a message system is:
   If the state of the database changed
   Harden the change log to disk here
   If there is a recovery system
   Assure the change log is hardened at the recovery site
   This becomes:
If the data of the database change
   If the change was not received from transport
     Transport cannot be a surrogate change log
     Harden the change log to disk here
     If there is a recovery system
       Assure the change log is hardened at the recovery site
The inclusion of the extra logic 'if the change was not received from transport' drops the cost of change logging because you only need to force the change log if the change did not come from the transport.

Figure 3:
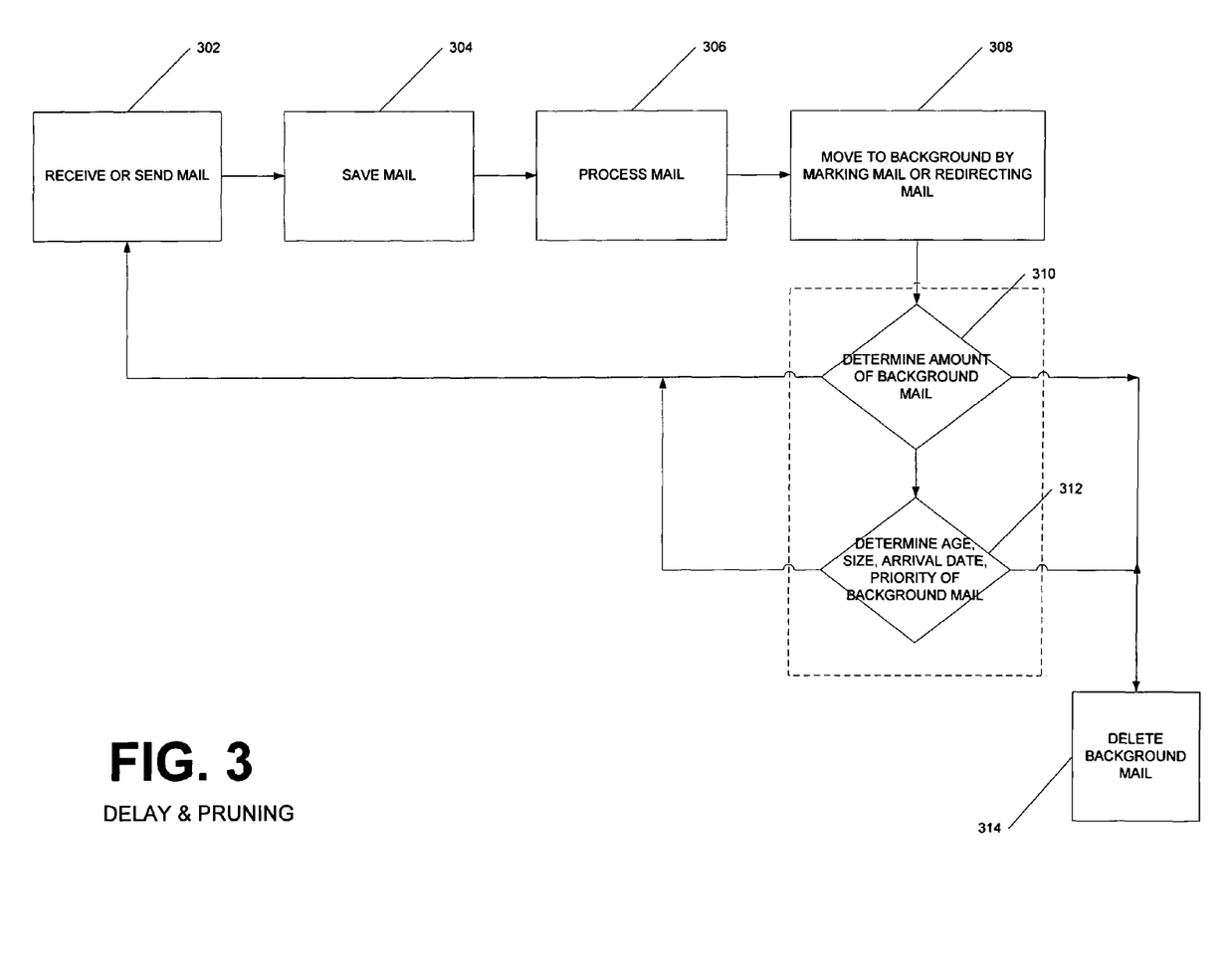
FIG. 3 is a flow chart illustrating one embodiment of the invention for delaying and pruning mail.

Referring to FIG. 3, a computerized method for handling messages according to one embodiment is illustrated. Server 104 receives and/or sends messages at 302 and stores the received and/or sent messages at 304. The stored messages are processed at 306 and, in the case or received and processed mail, the processed messages are sent. After processing of any sent mail and/or after processing and sending of any received mail, the server 104 moves the processed messages to a holding status, such as at 308 moving the messages to background message store 110 by marking or redirecting the messages. With this capability in effect, the deletion of that mail is delayed, allowing it to be replayed later if it is needed to recover from potential data loss due to a lost log file. In one embodiment, an Int64 may be added and a bit from it may be allocated to label a message as foreground or background. Thus, a database column is added to track the state of the message. Alternatively, this could be tracked as a separate destination queue for the message.

The remainder of FIG. 3 relates to pruning old mail. In one embodiment, a periodic background thread may be hooked to each message and a scan is conducted to identify the messages. Mail is scanned from the most recent to oldest to accumulate size, in order to trim the message store by size. Optionally, only items that are marked as background are deleted, so there are no in-memory references that need to be processed. In one optional embodiment, it is contemplated that some values may be able to be placed in a cache to minimize cost of the scan.

Periodically at 310 and at 312, the messages moved to the holding status are evaluated with respect to a parameter. For example, the parameter may be the amount of background mail so that at 310 the amount of background mail is determined. Alternatively or in addition, the parameter that may be determined at 310 may be any one or more of the following in any combination: message age, message size, message arrival date, and/or message priority compared to other messages in the background store. At 314, selected messages in the holding status are deleted as a function of the evaluating at 310 and 312.

In one embodiment, the instructions for performing the method may be on one or more computer-readable media have computer-executable components executed by a computing device for performing the method.

In summary, in one embodiment, a system for handling messages comprises a processor (e.g., server 104) configured to execute computer-executable instructions to receive messages at 302, store the received messages in a foreground memory at 304, process the stored messages in the foreground memory at 306, send the processed messages at 306, and move the sent messages to a background memory at 308. At 310 and 312, the processor evaluates the messages in the background memory with respect to a parameter and at 314 deletes selected messages in the background memory as a function of the evaluating.

Thus, the instructions to move the sent messages to a background memory comprise instructions to redirect the sent messages to the background memory, which is different with respect to the foreground memory.

In operation, all mail that is under delivery flows through the transport. The transport durably commits this mail to storage before accepting responsibility for the mail. The mail is then relayed to its ultimate destination or a node closer to its destination. This may involve multiple transfers as the mail may be bifurcated. Once all of the responsibility for a mail item has been transferred to another node, the transport can delete its durable copy of the mail.

It is desirable to be able to limit the size of the transport store. Un-deleted mail could grow unbounded. In certain applications, this may be necessary and acceptable. Alternately, we may want to bound the size of this store. This could be performed on many parameters including the time when the message was first received, when it was last relayed and/or the total size of the store.

Build a common scanner to also handle ReInjection, based off of ChunkingScanner, following the pattern of StrandedMailScanner. Addition configuration may be added to control pruning parameters. Pruning parameters may control how much mail can be held (count, or total bytes), maximum age, priority and other message attributes.

Re-Injection

In the event that an administrator or automated system detects that the mail should be re-played, this may cause the transport to re-scan the mail that would have otherwise been deleted and send it again. The mechanism may be coupled by a capability in the message store to not present mail delivered multiple times to the user.

Figure 4:
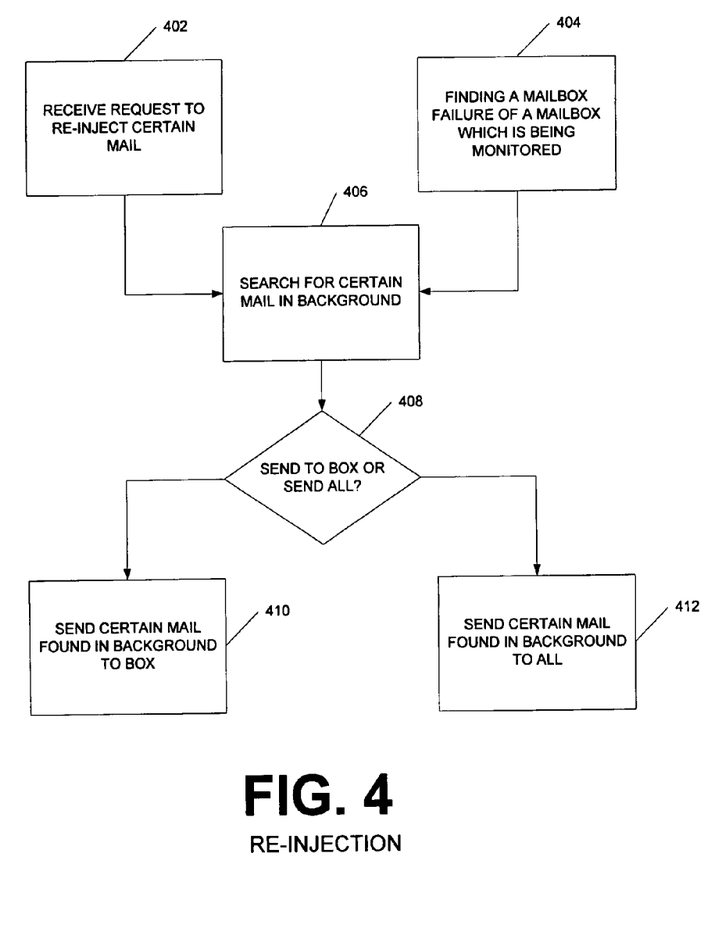
FIG. 4 is a flow chart illustrating one embodiment of the invention for re-injecting mail.

One embodiment of the present invention is directed to the embodiment illustrated in FIG. 4. Re-injection is initiated by the server 104 receiving a request to reject certain mail at 402 (e.g., from a user, administrator or mail box) and/or by the server 104 monitoring for a mailbox failure and finding a mailbox failure at 404. In response to either, the server 104 searches at 406 for certain background mail relating to the request or the failed mailbox. At 408, the server 104 determines whether mail should be sent to a particular mail box or all mail should be resent. At 410, certain mail found in the background is sent to its associated box or at 412 certain mail found in the background is sent to all.

In one embodiment, an additional RPC entry point may be added to initiate re-injection. Alternatively, the pattern of StrandedMailScanner may be followed or be invoked when replay is initiated meaning that the database can be re-scanned from start, of all items that are ready for re-injection.

Optionally, statistics about what mail was re-injected may be maintained.

Alternates

After sending at 306, messages may be dumped to a background file immediately. Alternatively, messages may be intercepted at a normal deletion point. Alternatively, messages may be appended/created to file tracking mail (e.g., to avoid NTFS CreateFile costs). It is typically more expensive to create new files than it is to append to existing files, so appending to an existing file may reduce costs.

Other alternatives include: including logic to start new files, pruning in the background through file system, re-injecting through pick-up directory and/or verifying that envelope information is sufficiently preserved. Files would be created over time as items are saved. But, in order to minimize the risk of this storage growing un-bounded, one option would be to have a background task to prune old files to keep the total storage bounded. One option is to do this through files by creating a single file of the right size and use it as a circular stream. Writing begins at the beginning of the circularly sized file and continues to the end of it. When writing reaches the end of the file, additional data is written to the beginning file. Thus, the size of the storage is managed and uses a bounded amount of space equal to the circularly sized file.

Another option to prune old files could be based on a target server receiving the files and based on a time during which the target server has replicated the received files. For example, if a given server X is known to have replicated all files received up to a time T, then such files could be pruned. In certain environments, this option may require keeping expanded address information.

In one embodiment, it is contemplated that disk I/O may be increased to accommodate such message handling as noted above.

It is also contemplated that in one embodiment the above may be applied to MTA resilience issues. For example, a second copy of a queue of messages of each MTA could be maintained on a second machine different from the MTA. In the event that the MTA has a hard crash and/or loses its queue, the MTA when restored would go back to each relay server to get them to re-relay lost mail. Lost mail would be identified by reference to the second copy of the queue on the second machine. Various techniques could be used to find the servers to re-relay lost mail. For example, every relay server could be queried. This embodiment adds a level of resilience to the MTA and, in one further embodiment, it is contemplated that it be implemented on hops after the first hop.

In summary, in one embodiment a system for handling messages comprises a processor 104 configured to execute computer-executable instructions to receive and/or send messages 302 and store at 304 a listing of the received and/or sent messages in a queue. The processor processes at 306 the stored messages and maintains a second copy of the queue with a separate machine. In the event that messages listed in the queue are lost, the lost messages listed in the second copy of the queue are recovered. For example, in the event that messages listed in the queue are lost, the processor contact each relay server to resend the lost messages listed in the second copy of the queue.

Having described various embodiments of the invention in detail, it will be apparent that modifications and variations are possible without departing from the scope of the various embodiments of the invention as defined in the appended claims.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein. For example, it is contemplated that executing or performing a particular element before, contemporaneously with, or after another element is within the scope of the various embodiments of the invention.

When introducing elements of the various embodiments of the present invention, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several advantageous results attained.

As various changes could be made in the above constructions, products, and methods without departing from the scope of the various embodiments of the invention, it is intended that all matter contained in the above description and shown in the accompanying drawings shall be interpreted as illustrative and not in a limiting sense.

What is claimed is:

1. A system for handling the relay of messages by a message transport agent comprising:
   a processor configured to execute computer-executable instructions for:
   receiving messages and sending messages at the message transport agent for relay;
   after receiving messages, storing the received messages in a foreground memory at the message transport agent;
   after storing the received messages in the foreground memory, processing the stored received messages;
   after processing the stored received messages, sending the processed received messages to at least one mailbox and holding the processed sent messages at the message transport agent by moving the processed sent messages to a holding status, wherein the instructions to move the processed sent messages to a holding status comprise instructions to:
   redirect the processed sent messages to a background memory;
   while continuing to store the received messages which have not been sent in the foreground memory which is different with respect to the background memory in which the processed sent messages are stored;
   monitoring the at least one mailbox for failure and resending sent messages in the holding status to a failed mailbox and resending sent messages in the holding status to all mailboxes upon failure of all the monitored mailboxes;
   evaluating the held sent messages in the background memory in the holding status at the message transport agent with respect to a parameter; and
   deleting selected held sent messages in the background memory in the holding status at the message transport agent as a function of the evaluating while continuing to store the received messages which have not been sent in the foreground memory,
   wherein the parameter comprises a maximum amount of memory, wherein the instructions to evaluate the moved messages in the holding status comprise determining an amount of holding memory storing the messages in the holding status, and wherein the instructions to delete comprise instructions to delete at least some of the messages in the holding status when the determined amount of holding memory exceeds the maximum amount of memory; and
   wherein the parameter further comprises a minimum message priority, wherein the instructions to evaluate the moved messages in the holding status comprise determining a priority of each message and wherein the instructions to delete comprise instructions to delete each message in the holding status when the determined priority of the message is less than the minimum message priority.

2. The system of claim 1 wherein the instructions to move the sent messages to a holding status comprise instructions to mark the sent messages as background.

3. The system of claim 1 wherein messages are deleted as a function of at least one of a message age, a message size, a message date, and a message priority.

4. The system of claim 1 wherein the parameter comprises a maximum message age, wherein the instructions to evaluate the moved messages in the holding status comprise determining an age of each message and wherein the instructions to delete comprise instructions to delete each message in the holding status when the determined age of the message exceeds the maximum message age.

5. The system of claim 1 wherein the parameter comprises a maximum message size, wherein the instructions to evaluate the moved messages in the holding status comprise determining a size of each message and wherein the instructions to delete comprise instructions to delete each message in the holding status when the determined size of the message exceeds the maximum message size.

6. The system of claim 1 wherein the parameter comprises a maximum message date, wherein the instructions to evaluate the moved messages in the holding status comprise determining an a date of each message and wherein the instructions to delete comprise instructions to delete each message in the holding status when the determined date of the message exceeds the maximum message date.

7. The system of claim 1 wherein the processor is configured to execute computer-executable instructions to receive a request for mail from a particular mailbox and to resend sent messages in the holding status to the particular mailbox in response to the received request and/or to resend sent messages in the holding status to all mailboxes in response to the received request.

8. A computerized method for handling the relay of messages by a message transport agent comprising:
receiving messages and sending messages at the message transport agent for relay;
after receiving messages, storing the received messages at the message transport agent in a foreground memory at the message transport agent;
after storing the received messages in a foreground memory, processing the stored received messages;
after processing the stored received messages, sending the processed received messages to at least one mailbox and holding the processed sent messages at the message transport agent while continuing to store the received messages which have not been sent in the foreground memory, said holding comprising moving the processed sent messages at the message transport agent to a holding status by either marking the processed sent messages as background or by redirecting the processed sent messages to a background memory, which is different with respect to the foreground memory in which the received messages are stored;
monitoring the at least one mailbox for failure and resending sent messages in the holding status to a failed mailbox and resending sent messages in the holding status to all mailboxes upon failure of all the monitored mailboxes;
evaluating the processed sent messages in the holding status at the message transport agent with respect to a parameter;
deleting selected processed sent messages in the holding status at the message transport agent as a function of the evaluating while continuing to store the received messages which have not been sent in the foreground memory, wherein the parameter comprises a maximum amount of memory, wherein evaluating the processed sent messages in the holding status comprises determining an amount of holding memory storing the processed sent messages in the holding status, wherein deleting comprises deleting at least some of the processed sent messages in the holding status when the determined amount of holding memory exceeds the maximum amount of memory, and wherein the processed sent messages are deleted as a function of at least one of a message age, a message size, a message date, and a message priority.

9. The method of claim 8 wherein one or more computer-readable media have computer-executable components executed by a computing device for performing the method of claim 8.

10. The method of claim 8 wherein the parameter comprises a maximum message age, wherein evaluating the moved messages in the holding status comprises determining an age of each message and wherein deleting comprises deleting each message in the holding status when the determined age of the message exceeds the maximum message age.

11. The method of claim 8 wherein the parameter comprises a maximum message size, wherein evaluating the moved messages in the holding status comprise determining a size of each message and wherein deleting comprises deleting each message in the holding status when the determined size of the message exceeds the maximum message size.

12. The method of claim 8 wherein the parameter comprises a maximum message date, wherein evaluating the moved messages in the holding status comprises determining a date of each message and wherein deleting comprise deleting each message in the holding status when the determined date of the message exceeds the maximum message date.

13. The method of claim 8 wherein the parameter comprises a minimum message priority, wherein evaluating the moved messages in the holding status comprises determining a priority of each message and wherein deleting comprise deleting each message in the holding status when the determined priority of the message is less than the minimum message priority.

14. A system for handling messages for relay by a message transport agent comprising:
a processor configured to execute computer-executable instructions for:
receiving messages at the message transport agent from at least one relay server;
sending the received messages at the message transport agent;
after receiving the messages, storing a listing of the received messages in a recovery queue at the message transport agent;
after sending messages, storing a listing of the sent messages in the recovery queue at the message transport agent;
after storing the listing of received messages, processing and sending the received messages;
maintaining a copy of the recovery queue at a computer remote from the message transport agent; and
in the event that messages listed in the queue are lost at the message transport agent due to a failure of the message transport agent, recovering the lost messages listed in the copy of the recovery queue in the remote computer to the message transport agent by contacting each relay server to resend to the message transport agent the lost messages listed in the recovery queue.

15. The method of claim 8 wherein said holding comprises marking the processed sent messages as background and wherein the parameter comprises a maximum amount of memory, wherein the instructions to evaluate the moved messages in the holding status comprise determining an amount of holding memory storing the messages in the holding status, and wherein the instructions to delete comprise instructions to delete at least some of the messages in the holding status when the determined amount of holding memory exceeds the maximum amount of memory.

16. The method of claim 8 wherein said holding comprises redirecting the processed sent messages to a background memory.

17. The method of claim 16 wherein the parameter comprises a maximum amount of memory, wherein the instructions to evaluate the moved messages in the holding status comprise determining an amount of holding memory storing the messages in the holding status, and wherein the instructions to delete comprise instructions to delete at least some of the messages in the holding status when the determined amount of holding memory exceeds the maximum amount of memory.

* * * * *